United States Patent [19]

Olson et al.

[11] Patent Number: 5,755,869
[45] Date of Patent: May 26, 1998

[54] METAL PIGMENTS STABILIZED AGAINST GASSING WITH FATTY ACID OR A MALEINIZED ALPHA-OLEFIN MODIFIED GASSING INHIBITOR

[75] Inventors: Kurt G. Olson; James E. Poole, both of Gibsonia; Paul H. Lamers, Allison Park, all of Pa.

[73] Assignee: PPG Industries, Inc., Pittsburgh, Pa.

[21] Appl. No.: 856,875

[22] Filed: May 15, 1997

[51] Int. Cl.$^6$ ..................................................... C09C 1/62
[52] U.S. Cl. ........................................ 106/404; 106/403
[58] Field of Search ........................................ 106/404, 403

[56] References Cited

U.S. PATENT DOCUMENTS

| | | | |
|---|---|---|---|
| 2,903,435 | 9/1959 | Babcock et al. | 106/404 |
| 3,085,890 | 4/1963 | Rolles | 106/404 |
| 3,918,984 | 11/1975 | High et al. | 106/404 |
| 3,926,874 | 12/1975 | Petty et al. | 106/287.17 |
| 4,565,578 | 1/1986 | Sutton et al. | 106/642 |
| 5,075,417 | 12/1991 | Trowell et al. | 528/272 |
| 5,183,504 | 2/1993 | Kuwajima et al. | 106/404 |
| 5,190,586 | 3/1993 | Mizuguchi et al. | 106/404 |
| 5,372,638 | 12/1994 | DePue et al. | 106/404 |

Primary Examiner—Mark L. Bell
Assistant Examiner—Scott L. Hertzog
Attorney, Agent, or Firm—Krisanne Shideler; William J. Uhl

[57] ABSTRACT

In accordance with the present invention, metal pigments are provided which are normally reactive with water or moisture to release hydrogen gas ("gassing") and which have been stabilized against such gassing by having their surfaces treated with an adduct of a maleinized fatty acid and/or a maleinized alpha-olefin and a polyol. Waterborne film-forming compositions which comprise an aqueous diluent medium, a film-forming polymer, and metal pigment stabilized against gassing by treatment with an adduct of a maleinized fatty acid or a maleinized alpha-olefin and a polyol are also provided.

21 Claims, No Drawings

METAL PIGMENTS STABILIZED AGAINST GASSING WITH FATTY ACID OR A MALEINIZED ALPHA-OLEFIN MODIFIED GASSING INHIBITOR

FIELD OF THE INVENTION

The present invention relates to metal pigments which are normally reactive with water or moisture to release hydrogen gas, stabilized against gassing by treatment of their surfaces with an adduct of a maleinized fatty acid and/or a maleinized alpha-olefin and a polyol, and waterborne coating compositions containing these metal pigments.

BACKGROUND OF THE INVENTION

Film-forming (coating) compositions containing metal flake pigmentation are useful for the production of the currently popular "glamour metallic" finishes upon the surface of automobile bodies. Such metal pigments include, for example, aluminum flake, copper bronze flake and metal oxide coated mica.

Recently, there has been an effort in the automotive industry to reduce atmospheric emissions of volatile solvents released during the painting process. One approach to this end has been to develop waterborne coating compositions. Unfortunately, many of the waterborne coating compositions containing metal flake pigments are unstable because some metal pigments react with the aqueous medium to produce hydrogen gas. Such "gassing" may cause unsafe pressure buildups in painting and storage equipment, and can adversely affect the appearance of the applied coating.

Prior art attempts to alleviate the problem of gassing include chrome treated aluminum pigments which are very expensive and treatment of the aluminum pigment with various fatty materials as disclosed in U.S. Pat. Nos. 3,918,984 and 4,565,578.

SUMMARY OF THE INVENTION

It is an object of the present invention to provide inexpensive metal pigments which have been treated to provide stability against gassing, and which are suitable for use in waterborne film-forming compositions.

In accordance with the present invention, metal pigments are provided which are normally reactive with water or moisture to release hydrogen gas ("gassing"), which have been stabilized against such gassing by having their surfaces treated with an adduct of a maleinized fatty acid and/or a maleinized alpha-olefin and a polyol. Waterborne film-forming compositions which comprise an aqueous diluent medium, a film-forming polymer, and metal pigment stabilized against gassing by treatment with an adduct of a maleinized fatty acid and/or a maleinized alpha-olefin and a polyol are also provided in accordance with the present invention.

DETAILED DESCRIPTION

The metal pigments of the present invention include any metal pigments which are generally used in pigmented waterborne film-forming compositions. Examples include metal flake pigments composed of aluminum, copper, zinc and/or brass as well as those composed of other malleable metals and alloys such as nickel, tin, silver, chrome, aluminum-copper alloy, aluminum-zinc alloy, and aluminum-magnesium alloy of the aforesaid examples, aluminum flake pigment is preferred.

The adduct used to treat the metal pigment and thereby stabilize it against gassing when in contact with water or moisture is an adduct of a maleinized fatty acid and/or a maleinized alpha-olefin and a polyol. Suitable fatty acids used in the formation of the adduct include those containing from about 12 to about 44, preferably about 12 to about 22 carbon atoms such as those derived from drying oils including tall oil (a mixture of rosin acids and fatty acids derived from pine pulp); linseed oil; soya bean oil; dehydrated castor oil (a source of ricinoleic acid); and tung oil (a source of eleostearic acid); and other fatty acids such as linoleic acid; linolenic acid; oleic acid; and the like. Suitable alpha-olefins include those containing from about 8 to about 20, preferably about 14 to about 20 carbon atoms such as octene, decene, octadecene, and dodecene. Specific examples of maleinized alpha-olefins include alkenyl succinic anhydride such as dodecenyl succinic anhydride and octadecenyl succinic anhydride. Mixtures of more than one maleinized fatty acid and/or maleinized alpha-olefin may also be used. Maleinized tall oil fatty acid is preferred.

Maleinization involves the reaction of maleic anhydride with the fatty acid and/or alpha-olefin via an addition reaction. The fatty acid used must therefore be unsaturated. The reaction is conducted by mixing the fatty acid and/or alpha-olefin with maleic anhydride in a small amount of a suitable solvent such as xylene, and heating to a maximum temperature of about 260° C. to effect maleinization.

The polyol used in formation of the adduct may be linear or branched. Suitable polyols include alkylene diols, such as ethylene glycol and neopentyl glycol and other diols, such as hydrogenated Bisphenol A, cyclohexanediol, cyclohexanedimethanol, caprolactonediol, for example, the reaction product of epsilon-caprolactone and ethylene glycol, hydroxy-alkylated bisphenols, polyether glycols, for example, poly(oxytetramethylene) glycol and the like. Polyols of higher functionality may also be used. Examples include polyester polyols, trimethylolpropane, trimethylolethane, pentaerythritol, and the like. Preferably, the polyol has at least one alkyl branch of 1 to 4 carbon atoms.

The preferred polyols are polymeric polyols prepared by addition polymerization of ethylenically unsaturated monomers, at least one of which has hydroxyl functionality. Suitable monomers include alkyl esters of acrylic or methacrylic acid such as methyl methacrylate, ethyl methacrylate, butyl methacrylate, ethyl acrylate, butyl acrylate, and 2-ethylhexyl acrylate. Other suitable polymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate. Hydroxyl functionality can be incorporated into the acrylic polymer through the use of hydroxyl functional monomers such as allyl alcohol, hydroxyethyl acrylate, hydroxypropyl acrylate, hydroxyethyl methacrylate, and hydroxypropyl methacrylate which may be copolymerized with the other ethylenically unsaturated monomers.

The addition polymer may be prepared by solution polymerization techniques in the presence of suitable initiators such as organic peroxides or azo compounds, for example, benzoyl peroxide or N,N-azobis(isobutyronitrile). The polymerization may be carried out in an organic solution in which the monomers are soluble by techniques conventional in the art. The polymeric polyol typically has a hydroxyl equivalent weight of about 200 to about 400. A particularly preferred polymeric polyol is a copolymer of styrene and allyl alcohol, commercially available from ARCO Chemicals Company as ARCO RJ-100.

The weight ratio of polyol to maleinized material used in making the adduct is usually from about 4:1 to about 1:6, depending on the type of polyol used. The ratio is preferably about 1:1.5. The acid value of the adduct may be in the range of about 50 to about 160, preferably from about 80 to about 100. The adduct is typically prepared by mixing together the maleinized material and the polyol at ambient pressure and heating the mixture to a temperature of about 120 to about 140° C.

It has been found that incorporation of the adduct into a waterborne coating composition containing metal pigment reduces or prevents gassing of the film-forming composition. It has also been found that the adduct can be incorporated into waterborne film-forming compositions without adversely affecting humidity resistance or appearance of dry films produced from such waterborne film-forming compositions. The waterborne film-forming composition of the present invention comprises an aqueous diluent medium, a film-forming polymer, and a metal pigment which has been treated with an adduct of a maleinized fatty acid and/or a maleinized alpha-olefin and a polyol. The tendency of the pigment to react with the aqueous medium and release hydrogen gas is prevented or reduced by incorporation of an effective amount of the adduct.

Various procedures may be used to incorporate the adduct of the present invention into a waterborne film-forming composition of the present invention. The metal pigment may be brought into contact with the adduct prior to the incorporation of the pigment into the waterborne film-forming composition. This may be done by adding the adduct to a pigment paste, or it may be added earlier such as during production of the pigment. Alternatively, the adduct of the present invention may be introduced into the waterborne film-forming composition of the present invention by simply introducing it as an additional ingredient of the waterborne film-forming formulation, for example during the mixing of film-forming polymer, metal pigment and aqueous diluent medium along with other conventional and optional ingredients such as crosslinking agents, cosolvents, thickeners, and fillers. The amount of adduct added to the formulation is sufficient to reduce or eliminate gassing of the metal pigment in the aqueous medium. Typically the weight ratio of adduct to pigment is about 1:5 to about 1.5:1, preferably about 1:1.

The treated metal pigment is present in amounts of about 10 to about 35, preferably about 15 to about 25 percent by weight based on the total weight of solids in the film-forming composition.

The film-forming polymer in the composition of the present invention may be any film-forming polymer suitable for use in a waterborne film-forming composition, as known to those skilled in the art. For example, waterborne base coats are disclosed throughout U.S. Pat. No. 4,403,003, and the film-forming polymers used in preparing these base coats can be used in the practice of this invention. Also, waterborne polyurethanes such as those prepared in accordance with U.S. Pat. No. 4,147,679 can be used as the film-forming polymer in the base coat. Further, film-forming polymers such as those described throughout U.S. Pat. No. 5,071,904 can be used in the film-forming composition of the present invention.

The film-forming polymer is present in amounts of about 20 to about 80, preferably about 40 to about 60 percent by weight based on the total weight of solids in the film-forming composition.

The film-forming composition may also include a crosslinking agent such as a blocked isocyanate or an aminoplast crosslinking agent containing methylol groups, methylol ether groups, or mixtures thereof. Aminoplast condensates are obtained from the reaction of formaldehyde with an amine or amide. The most common amines or amides are melamine, urea, or benzoguanamine, and are preferred. While the aldehyde used is most often formaldehyde, other aldehydes such as acetaldehyde, crotonaldehyde, and benzaldehyde may be used.

The aminoplast contains methylol groups and preferably at least a portion of these groups are etherified with an alcohol to modify the cure response. Any monohydric alcohol may be employed for this purpose including, for example, methanol, ethanol, butanol, and hexanol.

Preferably, the aminoplasts which are used are melamine-, urea-, or benzoguanamine-formaldehyde condensates etherified with an alcohol containing from 1 to 4 carbon atoms.

When present, the crosslinking agent is used in amounts of about 10 to about 40, preferably about 15 to about 35 percent by weight based on the total weight of resin solids in the film-forming composition.

If an aminoplast or other crosslinking agent is present, or if the film-forming polymer is self-crosslinkable, the film-forming composition will also preferably contain appropriate catalysts to accelerate the cure reaction. Examples of suitable catalysts are acidic materials and include, inter alia, sulfonic acid or a substituted sulfonic acid such as paratoluene sulfonic acid. The catalyst is usually present in an amount of about 0.5 to about 5.0 percent by weight, preferably about 1 to about 2 percent by weight, based on the total weight of resin solids in the film-forming composition.

Optional ingredients such as, for example, plasticizers, flow controllers, anti-oxidants, UV light absorbers and similar additives conventional in the art may be included in the composition. These ingredients are typically present at up to about 25 percent by weight based on the total weight of resin solids in the film-forming composition.

The film-forming composition of the present invention is typically formulated within a pH range of about 8.5 to about 9.0, preferably about 8.7 to about 8.9. Suitable pH-adjusting additives include, for example, amines such as dimethylethanolamine, triethylamine, diisopropanolamine, and the like.

The film-forming composition of the present invention may be used as a high gloss monocoat; that is, a high gloss pigmented coating. By "high gloss" it is meant that the cured coating has a 20° gloss and/or a DOI ("distinctness of image") measurement of at least about 80 as measured by standard techniques known to those skilled in the art. Such standard techniques include ASTM D523 for gloss measurement and ASTM E430 for DOI measurement.

The film-forming composition of the present invention may also be used as the pigmented base coat layer in a multi-component composite coating composition such as a "color-plus-clear" coating system, which includes at least one pigmented or colored base coat and at least one clear topcoat. The film-forming composition of the clear coat in the color-plus-clear system can be any of the compositions useful in coatings applications, particularly automotive applications, known to those skilled in the art.

The composition of the present invention may be applied to a substrate by any conventional coating technique such as brushing, spraying, dipping or flowing, but spray applications are preferred because of superior gloss. Any of the known spraying techniques may be employed such as compressed air spraying, electrostatic spraying and either manual or automatic methods.

After application of the film-forming composition, the coated substrate is heated to cure the coating. In the curing operation, solvents are driven off and the film-forming material of the coating is crosslinked. The heating or curing operation is usually carried out at a temperature in the range of from about 160 to about 350° F. (about 71 to about 177° C.) but if needed, lower or higher temperatures may be used as necessary to activate crosslinking mechanisms. The thickness of the coating is usually from about 0.5 to about 5 mils (about 12.7 to about 127 microns), preferably about 1.2 to about 3 mils (about 30.5 to about 76.2 microns).

EXAMPLES

The invention will further be described by reference to the following examples. Unless otherwise indicated, all parts are by weight. Examples A to E illustrate the preparation of various gassing inhibitors in accordance with the present invention.

EXAMPLE A

A gassing inhibitor was prepared as follows:

|         | Ingredient            | Weight in Grams |
|---------|-----------------------|-----------------|
| Feed A: | M-TOFA[1]             | 1318.1 g        |
|         | RJ-100[2]             | 1038.2 g        |
|         | M-Pyrol               | 785.4 g         |
| Feed B: | PROPASOL P[3]         | 785.4 g         |

[1] maleinized tall oil fatty acid, the reaction product of 74.3% tall oil fatty acid, 25.7% maleic anhydride
[2] copolymer of 80.2% styrene: 19.8% allyl alcohol having a hydroxyl equivalent weight of 293 available from ARCO Cheimcal Co.
[3] propylene glycol monopropyl ether A flask was charged with Feed A and heated to 120° C. under an inert nitrogen atmosphere and held at this temperature for 3 hours after which time the acid value was 107. The reaction was cooled and thinned with Feed B. The final product had solids of 59.8%, an acid value of 90.4, a Gardner-Holt viscosity of X-, and a weight average molecular weight of 6200 as determined by gel permeation chromatography using a polystyrene standard.

EXAMPLE B

A gassing inhibitor was prepared as follows:

|         | Ingredient        | Weight in Grams |
|---------|-------------------|-----------------|
| Feed A: | M-TOFA            | 659.1 g         |
|         | Pyramid RJ-100[1] | 543.9 g         |
|         | M-Pyrol           | 401. g          |
| Feed B: | PROPASOL P        | 401. g          |

[1] copolymer of styrene: hydroxyethyl acrylate having a hydroxyl equivalent weight of 308 available from PYRAMID Chemical Sales.

A flask was charged with Feed A and heated to 120° C. under an inert nitrogen atmosphere and held at this temperature for 3 hours. The reaction was cooled and thinned with Feed B. The final product had solids of 59.0%, an acid value of 93.3, a Gardner-Holt viscosity of U-, and a weight average molecular weight of 7900 as determined by gel permeation chromatography using a polystyrene standard.

EXAMPLE C

A gassing inhibitor was prepared as follows:

|         | Ingredient       | Weight in Grams |
|---------|------------------|-----------------|
| Feed A: | M-TOFA           | 756.4 g         |
|         | ESTERDIOL 204[1] | 153.0 g         |
| Feed B: | PROPASOL P       | 228.0 g         |

[1] 2,2-dimethyl-3-hydroxypropyl-2,2-dimethyl-3-hydroxypropanoate, available from Union Carbide Chemicals and Plastics Co., Inc.

A flask was charged with Feed A and heated to 120° C. under an inert nitrogen atmosphere and held at this temperature for 3 hours. The reaction was cooled and thinned with Feed B. The final product had solids of 80.0%, an acid value of 151, a Gardner-Holt viscosity of W, and a weight average molecular weight of 1300 as determined by gel permeation chromatography using a polystyrene standard.

EXAMPLE D

A gassing inhibitor was prepared as follows:

|         | Ingredient                                 | Weight in Grams |
|---------|--------------------------------------------|-----------------|
| Feed A: | M-TOFA                                     | 189.1 g         |
|         | ESTERDIOL 204                              | 153.0 g         |
|         | C16, C18 Alkenylsuccinic anhydride[1]      | 308.1           |
| Feed B: | PROPASOL P                                 | 162.5.0 g       |

[1] product of maleic anhydride and alpha olefin, anhydride equivalent weight of 337, available from ETHYL Corporation.

A flask was charged with Feed A and heated to 120° C. under an inert nitrogen atmosphere and held at this temperature for 3 hours. The reaction was cooled and thinned with Feed B. The final product had solids of 78.4%, an acid value of 121, a Gardner-Holt viscosity of V, and a weight average molecular weight of 1250 as determined by gel permeation chromatography using a polystyrene standard.

EXAMPLE E

A gassing inhibitor was prepared as follows:

| Feed A: | Ingredient              | Weight in Grams |
|---------|-------------------------|-----------------|
|         | Maleinized Linoleic acid[1] | 1177.0 g    |
|         | ESTERDIOL 204           | 204.8 g         |
|         | M-Pyrol                 | 345.4 g         |

[1] prepared from the reaction of linoleic acid and maleic anhydride

A flask was charged with Feed A and heated to 140° C. under an inert nitrogen atmosphere and held at this temperature for 6 hours. The final product had solids of 80.6%, an acid value of 147.5, a Gardner-Holt viscosity of Y, and a weight average molecular weight of 1300 as determined by gel permeation chromatography using a polystyrene standard.

Examples 1–6 illustrate the preparation of various pigmented film-forming compositions. Example 1 is a comparative control, illustrating the preparation of a pigmented film-forming composition containing a chrome treated aluminum pigment. Examples 2 and 3 illustrate various embodiments of the invention, while Examples 4 and 5 are comparative examples illustrating the preparation of pigmented film-forming compositions using fatty-type gassing inhibitors of the prior art. Example 6 is a control containing untreated aluminum pigment but no gassing inhibitor.

EXAMPLE 1 (Control)

A silver base coat composition was prepared which is available from PPG Industries Inc. as BWB-9021. This base coat contains a chrome-treated aluminum pigment.

EXAMPLES 2–6

The silver base coat composition of Example 1 was prepared, replacing the chrome-treated aluminum pigment with medium size aluminum flake pigment available from TOYO Aluminum K. K. and a gassing inhibitor as follows:

|  | Ingredient | Parts by Weight |
|---|---|---|
| Premix 1: | Ethylene glycol monohexyl ether | 22.2 |
|  | Diethylene glycol monobutyl ether | 7.1 |
|  | Propylene glycol monopropyl ether | 3.4 |
|  | Polypropylene glycol[1] | 12.0 |
|  | CYMEL 322[2] | 31.32 |
|  | TINUVIN 1130[3] | 3.2 |
|  | Phosphatized epoxy[4] | 1.1 |
|  | Gassing inhibitor | see tables below |
|  | Untreated aluminum[5] | 29.4 |
| Premix 2: | Latex[6] | 123.3 |
|  | Deionized water | 30 |
|  | Shell Sol 71[7] | 6.0 |
|  | Dimethylethanolamine (50% in deionized water) | 2 |

[1] molecular weight 425, available from ARCO Chemicals Co.
[2] partially iminated melamine formaldehyde resin available from CYTEK Industries, Inc.
[3] substituted benzotriazoie UV light stabilizer available from Ciba Geigy Corporation
[4] phosphatized epoxy prepared from EPON 828, a polyglycidyl ether of Bisphenol A available from Shell Oil and Chemical Co.; reacted with phosphoric acid in an 83:17 weight ratio
[5] available from TOYO Aluminum K. K. as 8260 NAR aluminum paste
[6] prepared according to U.S. Patent 5,071,904, see Example I, Part A
[7] mineral spirits available from Shell Chemical Co.

Premixes 1 and 2 were prepared separately and Premix 2 was added to Premix I under agitation. The final composition had a solids content of 38%, a pH of 8.7 to 8.9, and a viscosity of 24 seconds, measured using a #4 Ford cup.

| Example | Gassing inhibitor | Amount, g |
|---|---|---|
| 1 (Control) | none (chrome treated Al) | — |
| 2 | Example A | 32 |
| 3 | Example C | 24.4 |
| 4 | Comparative #1[1] | 5.8 |
| 5 | Comparative #2[2] | 9.6 + 9.6 |
| 6 (Control) | none | — |

[1] gas inhibiting agent comprising sorbitan monooleate prepared according to U.S. Patent No. 4,565,578, Example 1
[2] Gas inhibiting agent comprising sorbitan monooleate and ethoxylated fatty acid ester of sorbitan known as TWEEN 60 available from ATLAS Chemical Co., prepared according to U.S. Patent No. 3,918,984, Example 1.

The base coat compositions of Examples 1 to 6 were tested for gassing resistance as follows: The base coats were loaded into Erlenmeyer flasks immersed in a constant temperature bath (40° C.). Tubes connected the individual flasks to inverted gas burettes filled with water. The amount of gas evolved from each base coat was measured for seven days in milliliters by the displacement of water in the burette and is summarized in Table I below.

TABLE I

| Example | Hydrogen evolved, ml |
|---|---|
| 1 (Control) | 0 |
| 2 | 26 |
| 3 | 42 |
| 4 | 121 |
| 5 | >200 |
| 6 (Control) | >200 |

The data in Table I indicate that the gassing inhibitors of the present invention are effective for inhibiting gassing of aluminum pigment in a waterborne film-forming composition, and offer significantly improved gassing inhibition compared to fatty-type gassing inhibitors of the prior art.

EXAMPLES 7 and 8

The silver base coat compositions of Examples 7 and 8 were prepared by mixing together the listed ingredients in the order shown; Example 7 contained the chrome treated aluminum and Example 8 contained the untreated aluminum available from TOYO Aluminum K.K treated with the inhibitor of Example A.

|  | Ingredient | Parts by Weight |
|---|---|---|
| Premix 1: | Ethylene glycol monohexyl ether | 22.2 |
|  | Diethylene glycol monobutyl ether | 7.1 |
|  | Propylene glycol monopropyl ether | 3.4 |
|  | Polypropylene glycol[1] | 12.0 |
|  | CYMEL 1130[2] | 19 |
|  | RESIMENE 755[3] | 6 |
|  | TINUVIN 1130[4] | 3.2 |
|  | Phosphatized epoxy[5] | 1.1 |
|  | Gassing inhibitor | see tables below |
|  | Aluminum Pigment[6] | see tables below |
| Premix 2: | Latex[7] | 123.3 |
|  | Deionized water | 30 |
|  | Shell Sol 71[8] | 6.0 |
|  | Dimethylethanolamine, 50% in deionized water | 2 |

[1] molecular weight 425, available from ARCO Chemicals Co.
[2] fully alkylated melamine formaldehyde resin available from CYTEC Industries, Inc.
[3] partially iminated melamine formaldehyde resin available from Monsanto
[4] substituted benzotriazole UV light stabilizer available from Ciba Geigy Corporation
[5] phosphatized epoxy prepared from EPON 828, a polyglycidyl ether of Bisphenol A available from Shell Oil and Chemical Co.; reacted with phosphoric acid in an 83:17 weight ratio
[6] available from TOYO Aluminum K.K. as 8260 NAR aluminum paste
[7] prepared according to U.S. Patent 5,071,904, see Example I, Part A
[8] mineral spirits available from Shell Chemical Co.

| Example | Aluminum | Amount of Al, g | Gassing inhibitor | Amount of gassing inhibitor, g |
|---|---|---|---|---|
| 7 | Chrome Treated | 29.4 | none (chrome treated Al) | — |
| 8 | TOYO 8260 NAR | 29.4 | Example A | 32 |

The base coat compositions of Examples 7 and 8 were tested for gassing resistance as follows: The base coats were loaded into Erlenmeyer flasks immersed in a constant temperature bath (40° C.). Tubes connected the individual flasks to inverted gas burettes filled with water. The amount of gas evolved from each base coat was measured for seven days in milliliters by the displacement of water in the burette and is summarized in Table II.

TABLE II

| Example | Hydrogen evolved, ml |
|---------|---------------------|
| 7       | 28                  |
| 8       | 4                   |

The base coats were spray applied in two coats to electrocoated steel panels at a temperature of about 75° F. (23.9° C.) and a relative humidity of about 60%. A ninety second flash time was allowed between the two base coat applications. After the second base coat application, a prebake time of approximately five minutes was allowed at 200° F. (93.3° C.) before the application of an acid-cured polyepoxy clear coating composition available from PPG Industries, Inc., as DIAMOND COAT. See U.S. Pat. No. 5,196,485. The clear coating composition was applied to a base coated panel in two coats with a ninety second flash at 75° F. (23.9° C.) allowed between coats. The composite coating was allowed to air flash at 75° F. (23.9° C.) for ten to fifteen minutes and to flash at 140° F. (60° C.) for ten to fifteen minutes before heating to 285° F. (140.6° C.) for 30 minutes to cure both the base coat and clear coat. The panels were cured in a horizontal position.

The cured film was evaluated for gloss, distinctness of image (DOI), and cross-hatch adhesion both initially after cure and after humidity testing.

Gloss was measured at a 20° angle with a Glossmeter commercially available from Hunter Lab.

DOI was measured with a Glow Box Model GB11-87 commercially available from I²R in Cheltenham, Pa.

The humidity resistance of the coated panels was tested by keeping the coated panels in a humidity chamber operating at 100 percent relative humidity. Panels were kept in the humidity chamber for 120 hours at 120° F. (48.9° C.).

Intercoat adhesion was measured using test method ASTM D 3359 with a paint adhesion test kit commercially available from Paul N. Gardner Company, Inc., by scribing a coated substrate with a "cross-hatch" pattern and securely applying a piece of adhesive tape onto the scribe. The tape was then removed and the substrate examined for removal of the coating layers. A rating is given based on the area and layers of coating material removed by the tape, ranging from 0 ("complete failure of coatings") to 5 ("no removal").

TABLE III

| Example | Adhesion | Gloss | DOI   |
|---------|----------|-------|-------|
| 7       | 4/4−     | 85/83 | 48/36 |
| 8       | 5/4−     | 87/75 | 89/72 |

We claim:

1. Metal pigment particles stabilized against gassing when in contact with moisture or water by having their surfaces treated with an adduct of a maleinized fatty acid and/or a maleinized alpha-olefin and a polyol.

2. The metal pigment particles of claim 1, wherein said metal is aluminum.

3. The metal pigment particles of claim 2, wherein said aluminum is in flake form.

4. The metal pigment particles of claim 1, wherein said adduct has an acid value of about 50 to about 160.

5. The metal pigment particles of claim 1, wherein said adduct is derived from maleinized tall oil fatty acid and a polyol.

6. The metal pigment particles of claim 1, wherein said polyol is a polymeric polyol prepared by addition polymerization of ethylenically unsaturated monomers.

7. The metal pigment particles of claim 6, wherein said polymeric polyol is a copolymer of styrene and allyl alcohol.

8. The metal pigment particles of claim 1, wherein the weight ratio of adduct to pigment is about 1:5 to about 1.5:1.

9. The metal pigment particles of claim 1, wherein said adduct is derived from maleinized alkenyl succinic anhydride and a polyol.

10. A waterborne film-forming composition comprising:

(a) an aqueous diluent medium;

(b) a film-forming polymer; and (c) metal pigment particles stabilized against gassing when in contact with moisture or water by having their surfaces treated with an adduct of a maleinized fatty acid and/or a maleinized alpha-olefin and a polyol.

11. The waterborne film-forming composition of claim 10, wherein said metal is aluminum.

12. The waterborne film-forming composition of claim 11, wherein said aluminum is in flake form.

13. The waterborne film-forming composition of claim 10, wherein said adduct has an acid value of about 50 to about 160.

14. The waterborne film-forming composition of claim 10, wherein said adduct is derived from maleinized tall oil fatty acid and a polyol.

15. The waterborne film-forming composition of claim 10, wherein said polyol is a polymeric polyol prepared by addition polymerization of ethylenically unsaturated monomers.

16. The waterborne film-forming composition of claim 15, wherein said polymeric polyol is a copolymer of styrene and allyl alcohol.

17. The waterborne film-forming composition of claim 10, wherein the weight ratio of adduct to pigment is about 1:5 to about 1.5:1.

18. The waterborne film-forming composition of claim 10, wherein the metal pigment particles have been contacted with the adduct prior to incorporation of the pigment into the film-forming composition.

19. The waterborne film-forming composition of claim 10, wherein the metal pigment particles and the adduct are introduced separately into the film-forming composition.

20. The waterborne film-forming composition of claim 10, further comprising an aminoplast crosslinking agent.

21. The waterborne film-forming composition of claim 10, wherein said adduct is derived from maleinized alkenyl succinic anhydride and a polyol.

* * * * *